US008099416B2

(12) United States Patent
Qiu et al.

(10) Patent No.: US 8,099,416 B2
(45) Date of Patent: Jan. 17, 2012

(54) GENERALIZED LANGUAGE INDEPENDENT INDEX STORAGE SYSTEM AND SEARCHING METHOD

(75) Inventors: Weigen Qiu, Calgary (CA); Gang Chen, Beijing (CN); ShiQiang Wei, Beijing (CN)

(73) Assignee: ZI Corporation of Canada, Inc., Calgary, Alberta (CA)

( * ) Notice: Subject to any disclaimer, the term of this patent is extended or adjusted under 35 U.S.C. 154(b) by 439 days.

(21) Appl. No.: 12/107,943

(22) Filed: Apr. 23, 2008

(65) Prior Publication Data
US 2008/0263015 A1 Oct. 23, 2008

Related U.S. Application Data

(60) Provisional application No. 60/913,307, filed on Apr. 23, 2007.

(51) Int. Cl.
*G06F 7/00* (2006.01)
*G06F 17/30* (2006.01)

(52) U.S. Cl. ............... 707/741; 382/100; 725/52

(58) Field of Classification Search .......... 707/746, 707/741, 738, 742; 382/100; 725/52
See application file for complete search history.

(56) References Cited

U.S. PATENT DOCUMENTS

| 2,950,800 A * | 8/1960 | Caldwell | 400/110 |
|---|---|---|---|
| 4,689,743 A * | 8/1987 | Chiu | 341/20 |
| 4,951,202 A * | 8/1990 | Yan | 715/259 |
| 5,109,352 A * | 4/1992 | O'Dell | 715/262 |
| 5,299,123 A * | 3/1994 | Wang et al. | 707/999.002 |
| 5,649,185 A * | 7/1997 | Antognini et al. | 726/2 |
| 5,862,325 A * | 1/1999 | Reed et al. | 709/201 |
| 6,003,049 A * | 12/1999 | Chiang | 715/234 |
| 6,243,713 B1 * | 6/2001 | Nelson et al. | 707/999.107 |
| 6,613,100 B2 * | 9/2003 | Miller | 715/273 |
| 6,964,018 B1 * | 11/2005 | Masui | 715/259 |
| 7,315,982 B2 * | 1/2008 | Becker | 715/262 |
| 7,340,450 B2 * | 3/2008 | Sugahara et al. | 707/741 |
| 7,372,976 B2 * | 5/2008 | Rhoads et al. | 382/100 |
| 7,590,259 B2 * | 9/2009 | Levy et al. | 382/100 |

(Continued)

FOREIGN PATENT DOCUMENTS
CA        2 506 417 A1      6/2004
(Continued)

OTHER PUBLICATIONS

International Search Report and Written Opinion for PCT/CA2008/000749, Aug. 5, 2008, Zi Corporation of Canada, Inc. et al.

*Primary Examiner* — Yicun Wu
*Assistant Examiner* — Pavan Mamillapalli
(74) *Attorney, Agent, or Firm* — Michael A. Glenn; Glenn Patent Group

(57) ABSTRACT

The invention may be embodied as a system having and/or a method utilizing a searchable database of index information. Each index in the database may have (a) at least one descriptor, which matches an entry that a user might provide in order to identify an item, (b) a first pointer which identifies a location of the item, and (c) a second pointer which identifies a location of information that may be helpful to the user in deciding whether to request retrieval of the item. The first pointers of one index may be the same as first pointers in a different index. The second pointer may identify a general class to which an item belongs.

24 Claims, 5 Drawing Sheets

U.S. PATENT DOCUMENTS

| | | | |
|---|---|---|---|
| 7,716,224 B2* | 5/2010 | Reztlaff et al. | 707/741 |
| 7,817,140 B2* | 10/2010 | Fux et al. | 345/169 |
| 2002/0010639 A1 | 1/2002 | Howey et al. | |
| 2002/0116528 A1 | 8/2002 | Vale | |
| 2002/0170970 A1* | 11/2002 | Ehrhart | 235/462.41 |
| 2002/0193984 A1* | 12/2002 | Sugano | 704/2 |
| 2003/0023584 A1 | 1/2003 | Brandin | |
| 2003/0126120 A1* | 7/2003 | Faybishenko et al. | 707/3 |
| 2005/0144158 A1 | 6/2005 | Capper et al. | |
| 2006/0129928 A1* | 6/2006 | Qiu | 715/535 |
| 2006/0158436 A1* | 7/2006 | LaPointe et al. | 345/169 |
| 2007/0055689 A1 | 3/2007 | Rhoads et al. | |
| 2007/0156677 A1 | 7/2007 | Szabo | |
| 2008/0065606 A1 | 3/2008 | Boys et al. | |

FOREIGN PATENT DOCUMENTS

| | | |
|---|---|---|
| EP | 1 251 438 A2 | 10/2002 |
| WO | WO 01/80079 A2 | 10/2001 |

* cited by examiner

GENERALIZED LANGUAGE INDEPENDENT INDEX STORAGE SYSTEM AND SEARCHING METHOD

CROSS-REFERENCE TO RELATED APPLICATION

This application claims the benefit of priority to U.S. provisional patent application Ser. No. 60/913,307, filed on Apr. 23, 2007.

FIELD OF THE INVENTION

The present invention relates to devices for and methods of identifying and providing information.

BACKGROUND OF THE INVENTION

Widespread search of electronic files has become commonplace with several commercial "search engines" offering the ability to search using keywords. Access to such services has been provided to mobile personal appliances such as PDAs (Personal Digital Assistants) and of course cellular telephones. Where alphabetic or syllabic data is to be entered, unambiguous entry or reduced-size disambiguating systems are in widespread use. This may require that a browser be invoked and the appliance caused to replicate the performance of a computer terminal.

The use of keyword searches has also been adopted to allow the user to perform local searches. In those situations, the user is permitted to enter a keyword in order to search content that is stored on the appliance (i.e. stored "locally") at least temporarily. Typically indices may be created that allow an entered keypad sequence to be rapidly matched to content which may in turn facilitate access to the sought material. An example of such functionality is described in the published US patent application, publication number 20060158436, titled User Interface With Augmented Searching Characteristics, hereby incorporated by reference. Since an appliance is typically used by only one user, the local content is often stored in a manner that is in the language commonly used by the user, and this enables local keyword searches to be performed easily.

A search beyond the boundaries of the local environment of the appliance may be achieved in many ways. However, a limiting factor is that the symbology used to create the search keywords is limited to alphabetic structures of a particular language and may not be applied easily to other languages, especially languages which are ideographic in nature. Ideographic languages are normally handled by localization techniques applied at the session level by such methods as mode selection.

SUMMARY OF THE INVENTION

The invention may be embodied as a system having a searchable database of index information. Each index in the database may have (a) at least one descriptor, which matches an entry that a user might provide in order to identify an item, (b) a first pointer which identifies a location of the item, and (c) a second pointer which identifies a location of information that may be helpful to the user in deciding whether to request retrieval of the item. One or more of the descriptors may be a number, and/or one or more of the descriptors may be text. An item pointed to by a first pointer may be information, and/or a computer program. The first pointers of one index may be the same as the first pointers in a different index. The second pointer may be a type indicator, which identifies a general class to which an item belongs.

The invention may be embodied as a method. In one such method, an item is retrieved. To do so, a searchable database of index information may be provided. Each index in the database may have (a) at least one descriptor that may match an entry that is expected to be entered by a user in order to identify the item, (b) a first pointer which identifies a location of the item, and (c) a second pointer which identifies a location of information that may be helpful to the user in deciding whether to request retrieval of the item. A search query may be entered, and the database may be searched for descriptors that match the query. Upon finding an index having a matching descriptor, the first pointer may be used to locate at least one selectable icon and the second pointer may be used to locate information that may help the user decide whether to request retrieval of the items. Then a list of selectable icons may be provided to the user, the icons corresponding to the first pointers of indexes having matching descriptors. The list of selectable icons may include information identified by the second pointer.

For example, the second pointer may be a type indicator, which identifies a general class to which an item belongs. By knowing the general class of the item, a user may be made aware of the general nature of the icon that has been provided to the user, and thereby assist the user with determining whether to select a particular icon. For example, via the information pointed to by the second pointer, the user may be assisted with distinguishing between icons and/or to identify indexes that may be desired by the user, but which do not have matching descriptors.

In one embodiment of the invention, the type indicator may be displayed as an icon itself, and upon selecting that icon, the list of icons may be re-arranged so as to display all the icons having that type indicator in one area of the display. In doing so, the user may be allowed to narrow the field of desired icons before identifying and selecting a desired icon. This may be particularly helpful when the user's query is not among the descriptors of a desired item.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
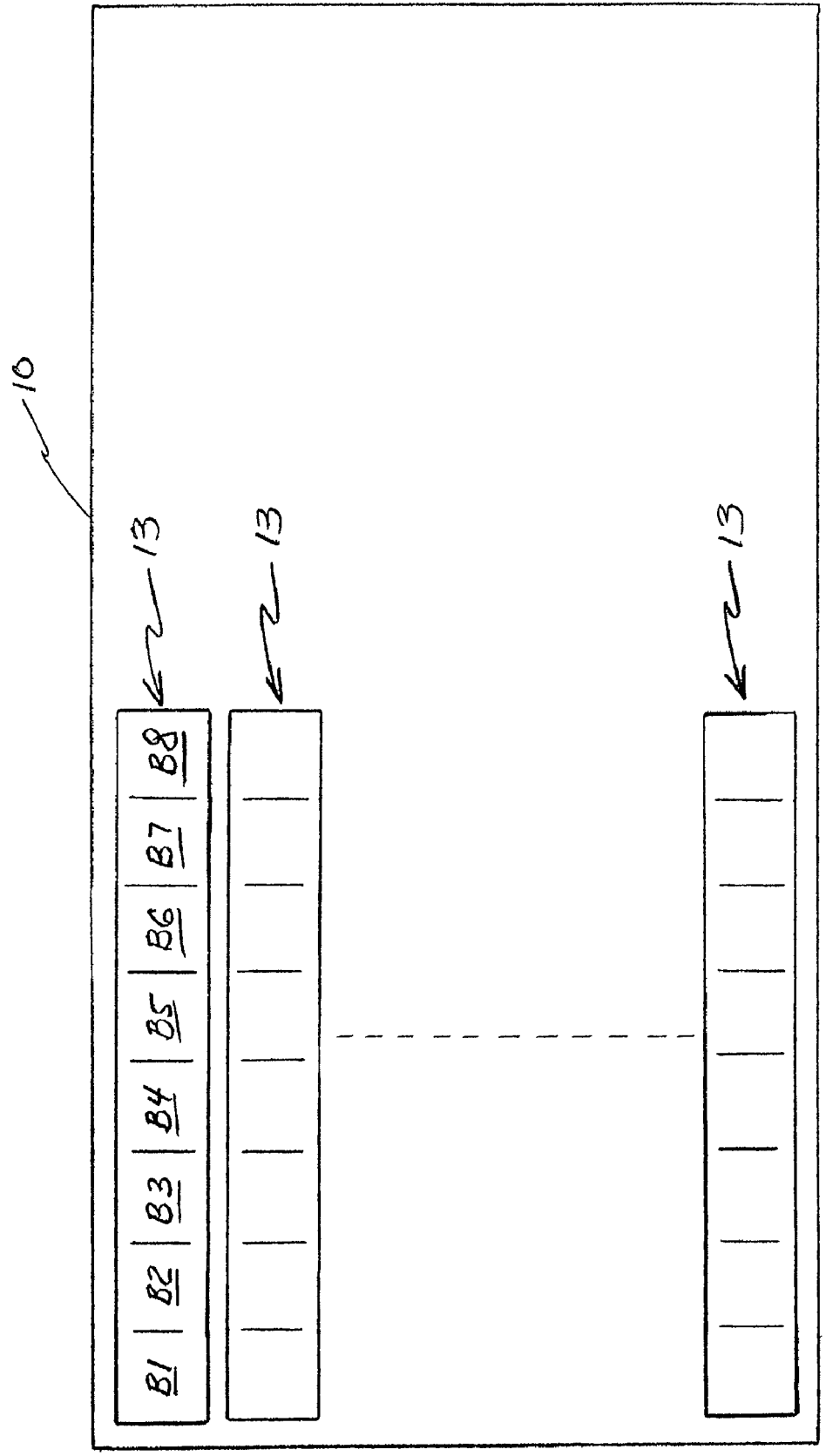
FIG. 1 depicts a database according to the invention.
Figure 2:
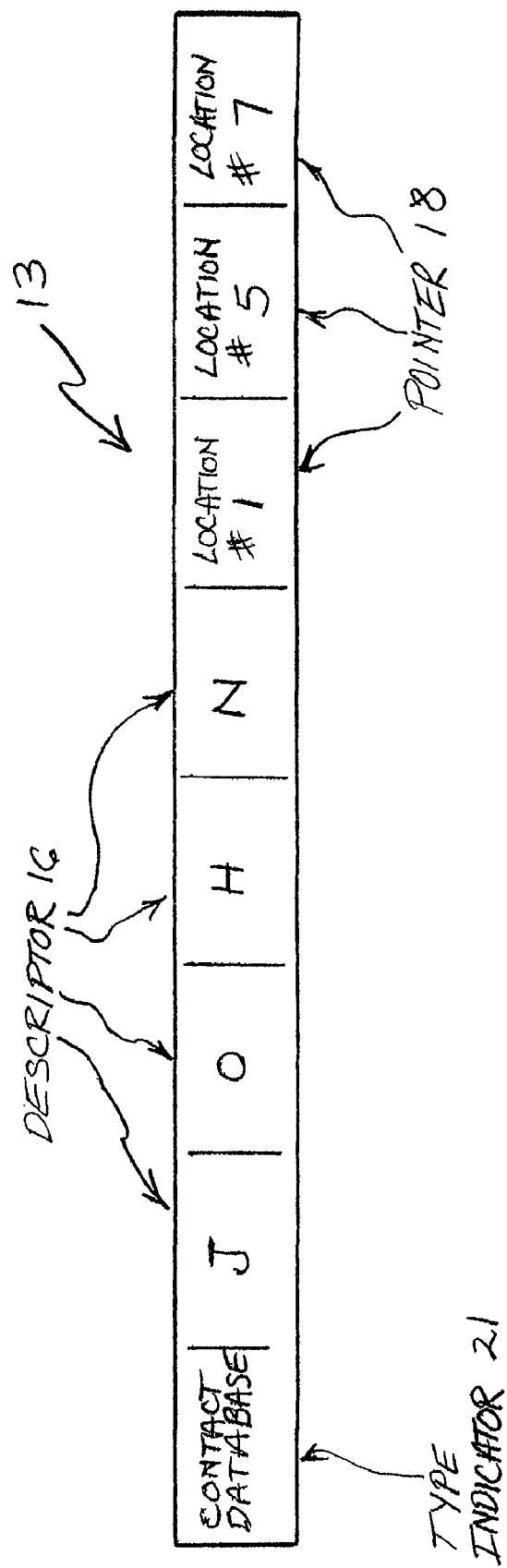
FIG. 2 depicts an index according to the invention.

FIG. 1 depicts a database 10 according to the invention. The database 10 has index information 13 related to items. For example, an item may be a piece of information or a computer program that is stored in an electronic memory. FIG. 2 depicts one of the pieces of index information 13. Each index 13 has at least one descriptor 16, a first pointer 18, and a second pointer 21. The second pointer 21 may be a type indicator.

Each descriptor 16 is an entry that a user might provide in order to find an item. For example, if the user wanted to find contact information for John Smith, the user might enter text, such as the word "Smith" or the word "John". FIG. 2 depicts an index 13 in which the descriptors 16 are the letters "J", "O", "H" and "N". Or the descriptor 16 might be a number, such as the first numbers in John Smith's phone number. It should be noted that an item may have one, or more than one, descriptor 16.

When the device utilized by the user to enter "John" or John Smith's phone number, as the case may be, employs polysemous keys, the user's input may not be the letters "J" and "O", but instead may be the signal provided by pressing a key with "J" inscribed on it followed by the signal provided by pressing a key with "O" inscribed on it. For example, using the key pad found on many desk-top telephones, the key presses would correspond to pressing the key with "5jkl" (the "5" key) followed by the key with "6mno" (the "6" key). Therefore, initially the system may not know whether the user's entry of 5 then 6 is an attempt to identify indexes 13 corresponding to "John Smith" or indexes 13 corresponding to "Kojo The Dog" or phone numbers having the number 5 followed by the number 6. As such, a system using polysemous keys may need to provide, at least initially, icons corresponding to John Smith as well as icons corresponding to Kojo The Dog and phone numbers having a 5 followed by a 6. However, once the user provides a third entry, e.g. by pressing the "4ghi" key (the "4" key), icons corresponding to Kojo The Dog may be removed from the displayed list since indexes having descriptors 5,6,5 would not correspond to the 5,6,4 sequence entered by the user, thereby making the user's selection of a desired icon easier.

The first type of pointer 18 identifies a location of an item. For example, a first pointer 18 might identify where the phone number or address for John Smith can be found in a contact database. The first pointer 18 may identify directly or indirectly a memory location in which an item is stored. An example of an indirect method would be a situation in which the first pointer 18 in the index 13 identifies a position in a table where the lengthier memory address is stored for retrieval and use in finding an item. Also, the first pointer 18 may identify an icon corresponding to the item.

The second pointer 21 may identify a location of general information that may be helpful to the user in deciding whether to request retrieval of the item. For example, the second pointer 21 may identify a general class to which an item belongs. For example, the second pointer 21 may be a type indicator which identifies a contact database having pieces of information, or the type indicator may identify a computer program that is focused on assisting a user with entering names and addresses into a contact database. Other type indicators 21 may identify a music database or an image database.

In one embodiment of the invention, each index 13 includes eight bytes, each of which may be used to identify 256 different values. One or more of the bytes may be used to store second pointers 21 in the form of type indicators, one or more of the bytes may be used to store descriptors 16, and one or more of the bytes may be used to store pointers 18. In a preferred embodiment, one of the bytes is used to store the type indicator, four bytes are used to store descriptors 16, and three bytes are used to store more than one of the first type of pointer 18. The database 10 depicted in FIG. 1 depicts indexes 13 having eight bytes, labeled B1 through B8, and identifies which of these bytes is used to store the various components of the index.

Figure 3:
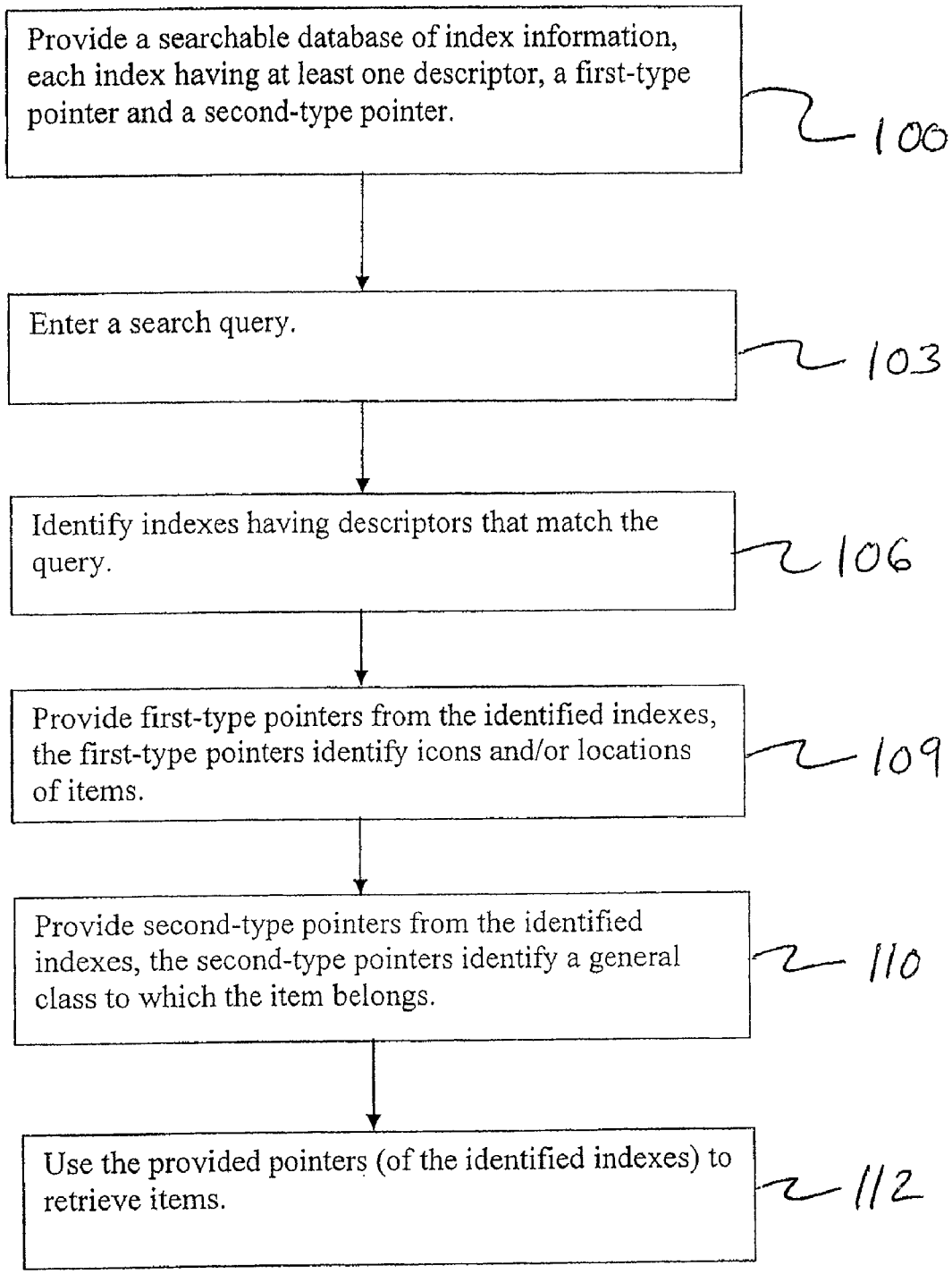
FIG. 3 is a flow chart of a method according to the invention.

The index information 10 may be used in a method that is in keeping with the invention. The method may be used to retrieve an item. FIG. 3 depicts one such method. A searchable database of index information is provided 100, and each index 13 in the database may have (a) at least one descriptor 16 which a user might provide in order to identify the item, (b) a first type of pointer 18 which identifies (directly or indirectly) a location of the item, and (c) a second type of pointer 21 which identifies a location of general information that may be helpful to the user in deciding whether to request retrieval of the item. If a search query is entered 103 by a user, the database may be used to identify 106 indexes 13 having descriptors 16 that match the search query. Once matching descriptors 16 are found, those indexes 13 are used to provide 109 pointers 18 of the first type. A list may be provided which corresponds to those items that are pointed to by indexes 13 having a descriptor 16 matching the query. Then the pointers 18 may be used 112 to identify locations from which items may be retrieved.

In one embodiment of the invention, the first-type-pointers 18 identify icons that may be displayed on a list. The icons may be selected from the list by a user. By selecting one of the icons, a particular item may be specifically identified and then provided to the user.

For example, if the user of a PDA enters the letter "J" followed by the letter "O", the appliance may search for indexes having descriptors 16 "J" and "O". For example, the appliance may identify an index 13 corresponding to John Smith, and display a text icon in the form of "John Smith". Also, the appliance may identify an index 13 corresponding to Don Johnson and display a photo of Mr. Johnson, or may display a link to a web site for fans of the television show "Miami Vice". If the user selects the icon corresponding to John Smith, the appliance may retrieve information from the locations identified by the first-type-pointers 18. According to FIG. 2, those locations might be memory locations 1, 5 and 7. Once the information at the pointer locations is retrieved, the appliance may display the retrieved information to the user. For example the retrieved information might be as follows:

John Smith
32 Main Street
Calgary, Alberta, Canada

A first-type-pointer 18 might also facilitate retrieving a photo of John Smith, or John's birthday or phone number.

The method may be practiced to permit use of type indicators in order to facilitate finding a desired item. Use of a type indicator may assist with finding a desired item when the user's query does not match the descriptors 16 for the desired item. In such a method, once a match between a descriptor 16 and the search query is made, the second type of pointer 21 for the index information 13 having that match may be used to provide 110 a type indicator. The provided type indicator is then used to identify other indexes 13 having a matching type indicator. The list displayed for the user's selection may be augmented to include selectable icons corresponding to the indexes 13 that have a type indicator that was identified as matching the type indicator of an index 13, which had a matching descriptor 16. The idea may be illustrated using the example above. If "J" and "O" are entered into the PDA, the index depicted in FIG. 2 may be identified by the PDA, and the PDA may recognize that the second pointer 21 of that index 13 has a type indicator that is the Contact Database. Having identified the Contact Database, the PDA may display an icon corresponding to the Contact Database, and if this icon is selected by the user, a list of information from the Contact Database may be provided, with the entries above and below John Smith's entry being displayed to the user for selection. In this manner, the user may quickly move to a point in the Contact Database and easily identify someone other than John Smith whose name is listed alphabetically nearby.

Alternatively, by selecting the Contact Database icon, other icons in the selectable list may be grouped so that those icons having indexes with a second-type-pointer 22 that identifies the Contact Database. In this manner, the user may be able to more easily and quickly select an icon corresponding to the Contact Database.

The second-type-pointer 21 may be used for other purposes. For example, the second-type-pointer 21 may be used to identify general information that augments the icon identified by the first-type-pointer, and which is provided to the user. Such general information may indicate to the user more clearly what will be retrieved if that icon is selected. To illustrate how this might occur, consider that the icon "John Smith" might appear twice in the selectable list, once with a symbol that indicates that the contact information for John Smith will be retrieved, and a second instance along with a symbol that indicates that John Smith's recipe for barbeque sauce will be retrieved from a Recipe Database. As such, the user need only remember John's name in order to find both John Smith's contact information and John Smith's recipe. If a second-type-pointer 21 is not used, then a user may be inconvenienced by having multiple possibilities from an entered query without a clue to aid in selection.

It should be noted that the general information identified by the second-type-pointer may be provided to the user visually or audibly. For example, general information may be provided visually by varying the color of the icon pointed to by the first-type-pointer 18, or the general information may be provided visually in the form of an additional icon. If an audible indication of the general information is provided, the indication may be in the form of an audible output provided by a computer program stored on the PDA and activated by dragging a cursor across the icon pointed to by the first-type-pointer 18 in order to cause a sound to be emitted from the PDA—for example, the PDA may say "contact database".

The list may be arranged to assist the user with identifying desired icons. For example, the list may be arranged to display more prominently those icons corresponding to indexes 13 having matching descriptors 16. Icons corresponding to indexes 13 which do not have matching descriptors 16, but have matching type indicators, may be displayed less prominently.

Another means of arranging icons is to use a statistical analysis, by which the list is arranged according to a statistical evaluation of the icons to be displayed. In one such means, the analysis is carried out by considering the frequency that a user has selected an icon, and by also considering the time that has lapsed since an icon was last selected. Other techniques for arranging icons in a list are well known (and therefore will not be explained herein), and may be used in this invention.

Figure 4:
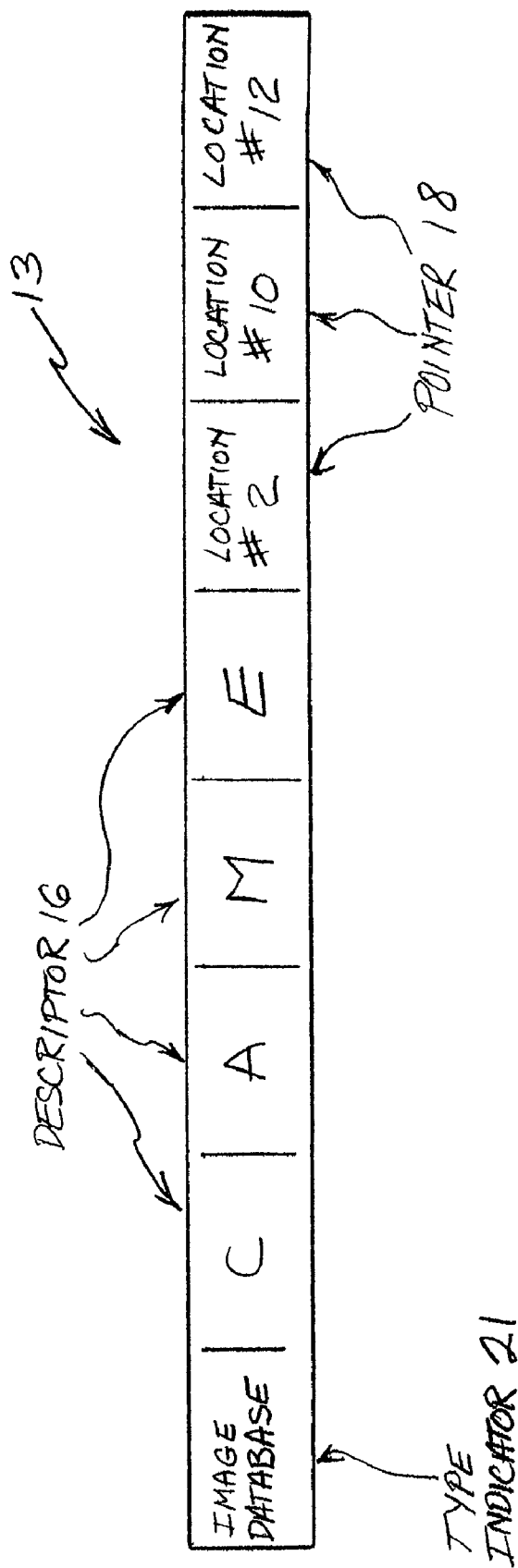
FIG. 4 depicts another index according to the invention.

For example, if the user enters the letters "C", "A" and "M", the PDA may identify the index 13 depicted in FIG. 4. Memory location #2 may point to an icon and a corresponding program that operates the camera that is on the PDA. If the camera icon is selected, the user will be permitted to take and store a picture. Memory location #10 may point to an icon (the "photo icon") and point to a program that retrieves pictures that are stored in the PDA. Since the user entered "C", "A" and "M", and this entry corresponds more closely with the descriptors 16 of the index 13 for the camera function than with the descriptors 16 of the photo function, the PDA may be programmed to display the camera icon in a position that is more prominent than the icon for the photo function.

Figure 5:
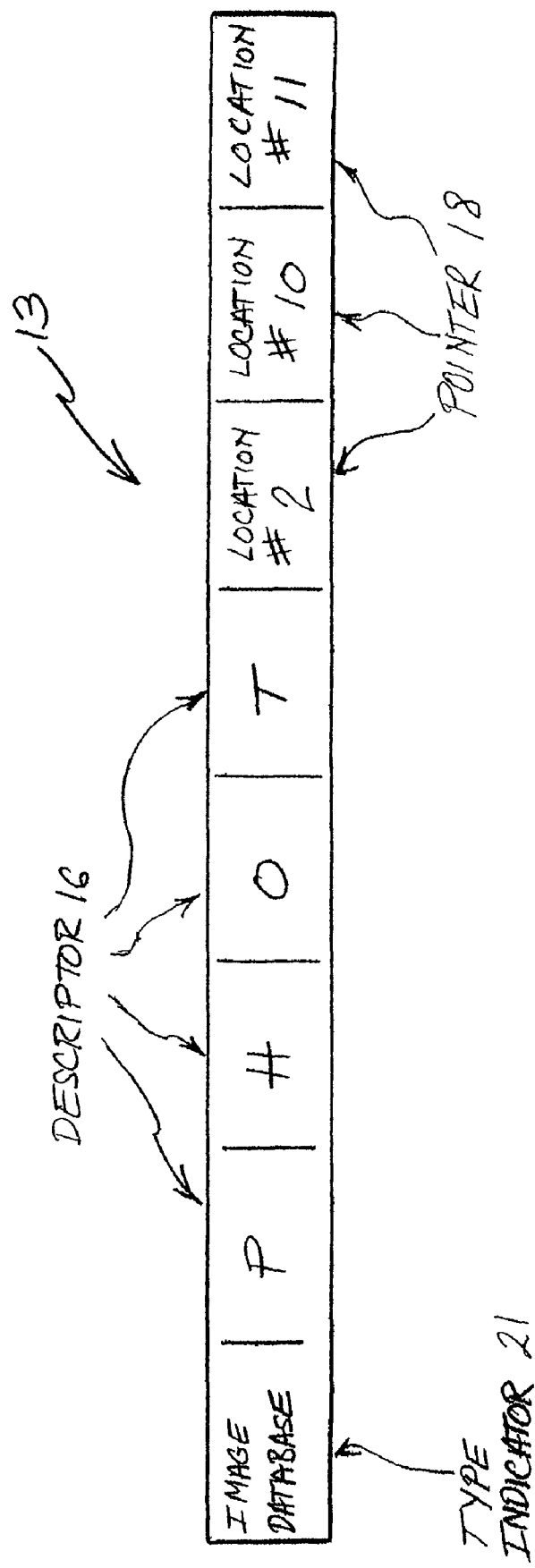
FIG. 5 depicts another index according to the invention.

If the photo function most closely corresponds to an index 13 like that depicted in FIG. 5, it will be noted from the example above that the photo function can be reached via the index 13 depicted in FIG. 4 even though the descriptors 16 for the photo function (see FIG. 5) do not include "C", "A" or "M". In this manner, the PDA may be made easier for the user to operate by permitting the user to enter the descriptors 16 for the camera function, but instead select the photo function.

Also, the list that is provided to the user may be arranged so that icons corresponding to items with matching descriptors 16 (in this example the camera function) are placed in one location, while icons corresponding to items without matching descriptors 16 (in this example the photo function) are placed in another location. When the icons are organized in this manner, it may be useful to provide an icon corresponding to the Image Database, so that when the user selects the Image Database icon, the other icons are arranged so that icons corresponding to the Image Database (like the camera function and the photo function) are displayed to the user near the top of a monitor and grouped together. In this manner, the user may be able to quickly identify the photo function even though he has entered a descriptor 16 for the camera function.

It should be noted from the examples above, that the first pointers 18 may be used to identify information and/or functions that are related in the user's mind by causing related indexes to have pointers identifying the location of the other item. This ability may be useful in identifying synonyms. This may be particularly useful in ideographic languages. For example, if the PDA supports entry of the strokes for an ideographic character along with an alphabetic equivalent, such as PinYin, the user may be enabled to enter the strokes and receive both the symbol and the PinYin counterpart, or the user may be enabled to enter the PinYin and receive both the ideographic character and the PinYin counterpart. So, generally speaking, when non-alphabetic languages are used, one entry method may be used to identify two different representations of the entry. Similarly, the second-type-pointer 21 may be quite different between two indexes 13, and yet facilitate quick retrieval of items that are associated in the user's mind.

Using the Chinese language as an example which has relatively high complexity in this regard, the characters may be entered by the user in a number of ways. Two usual ways might be to use PinYin, where the sound of the character is spelled by the user by entering each letter in the way that an alphabetic entry might be made, or to use a stroke entry method where categorical strokes are entered in the sequence in which the intended character is usually written. U.S. Pat. No. 5,109,352 more completely describes this technique and is incorporated by reference. Although it might be practical to store the character and then use an editor method to create the character and then seek a match, this may be cumbersome. By creating indexes which may be searched using the direct entry of the keypress sequences, considerable improvement may be achieved. It is effective to make the index structure consistent across the broad range of possible entries in a reduced keypad environment, and a considerable advantage may be realized by retaining ambiguity as to which character is desired by the user, as opposed to resolving it automatically. Thus, by simply storing assigned key values, rather than the possible discrete letters and allowing the user to disambiguate contextually from the match list, the descriptor 16 field of the index may be realized economically and all languages may be supported consistently. It is axiomatic that a long enough sequence becomes unique in most language datasets and the statistics of a typical mobile appliance dictionary taken from an English corpus achieves this generally in fewer than 8 letters or keypresses. Thus, since each keypress can be stored as a nibble or half-byte, four bytes may allow the appliance to resolve most lists to a manageable residue of candidates that may be acceptable to the user.

The stored elements in a typical smart-phone having exemplar databases of words and names in both Latin and Hanzi (Chinese) characters and of course numeric sequences can be indexed according to an index structure as described above. The Latin and Numeric sequences may be stored directly in the descriptor 16 field but the ideographic characters may not be stored directly. In order for this to be achieved, each Hanzi character may be decomposed into at least two indexable parts. For each Hanzi character, the PinYin value may be recovered and then stored and also its stroke order may be stored.

Having described the invention, it will be recognized that the invention may be used to create a system having more than one index pointing to the same item. Such a method facilitates matching entered symbols from a keypad of polysemous keys. In addition to the allocations of symbols normally found on a typical telephone keypad, symbols representative of elements particular to the entry of ideographic text may also be assigned. For example, syllabic elements peculiar to the Japanese Kana sets and markings specific to the Taiwanese BoPoMoFo alphabet may also be included either in addition to or as replacements for the conventional markings.

An appliance that is programmed according to the invention will facilitate rapid search, thus assisting a user in locating an item with a limited number of sequential keypresses which sequence may be shorter than the total number of characters in the full descriptor 16 of an item.

Furthermore, full storage is not expected to be necessary in the descriptor 16. A four byte/eight nibble descriptor 16 field may be efficiently used for phrase indexing for many practical phrase-lengths. In a one character expression, the character may be indexed using its full PinYin sequence and may also be indexed using its initial stroke categories (up to eight initial strokes in the example described herein). This may require the creation of two indexes having the same pointers and the same type indicator. If there are more type indicators, then further indexes may be required. In general, there are a few ambiguities remaining in a typical language corpus after eight strokes are entered, but in a limited dataset typical of a personal appliance, ambiguity is generally minimal. For example, when more than one ideographic character is contained in a phrase, the system may be modified so that the fourth character in the phrase may be indexed as described above, and subsequent characters in the phrase may be simply ignored and no more than the parameters for four characters need be stored. If there are fewer characters in the phrase than there is space in the descriptor 16 fields, e.g. only three characters, then the third character may be stored in one index, the second and third characters may be stored in another index and all three characters may be stored in a third index. For each character in the phrase, both a pinyin and a stroke index 13 may be created. For any phrase, no more than eight indexes 13 need usually be created. All indexes 13 for a particular phrase have a pointer that is common to all of the indexes 13 for that phrase, and that pointer 18 points to a location where the phrase is located and may be retrieved.

Although for a single character, a full PinYin entry may be created with good advantage, for polysyllabic phrases and names that are typical of modern Chinese, a more efficient recovery system may be implemented by using the invention to shorten storage requirements, and therefore reduce the memory of the PDA and increase the speed with which a user may identify an item stored in the PDA. Similarly for a stroke index, requiring more than eight strokes to be identified in order to focus to a reasonable number of options is rarely useful for a single character, and therefore a shortened descriptor 16 may be used for phrases. Using the first two letters of the PinYin entry for each character in the phrase, when two or more characters are present, may be sufficient for most purposes. Thus for the phrase Zhong Guo Ren Min . . . we need only store the categorical initial pairs "ZH" "GU" "RE" "MI" which (using a standard telephone keypad) would be the numeric sequence 94487364. Implementing the suffix trie described above would also have indexes 13 corresponding to 487364, 7364 and 64 all of which would identify the same phrase but might also identify other phrases as the sequence length diminishes and exhibits increased ambiguity. It may be advantageous to store the fourth character as its full PinYin as 646 since it is a single full character at that point. In a similar way, a numeric sequence that corresponds to stroke categories may also be matched by storing in the descriptor 16 field the initial stroke pairs for each character. The descriptor 16 field may be justified right or left with nulls in the field handled, as known in the art.

In another aspect of the invention, an auxiliary table may be maintained that allows search errors to be handled where such errors are known, such as systematic linguistic anomalies. For example, certain languages exhibit pronunciation changes of words or syllables depending on other words or syllables associated with them. In the case of certain European languages, this may be seen as a mutation in the initial letter or letters of a single word and is generally frequent when gender agreement is required. Changing from the masculine to feminine form is the most frequent cause of such mutations. For example, in Welsh, "his cat" is written "ei gath", whereas "her cat" is written "ei chath". The effect of either of these anomalous but repeatable adaptations is to modify the spelling of the sound of the word or character. Thus, if a list of alternate spellings is kept, then the matching algorithm may attempt to match the entered sequence, as well as known variants. In addition to the burden of this extra list, there may be instances where unwanted matches are displayed to the user, but the significant advantage is that user errors are less likely to produce no result.

In a related aspect, common errors may be alleviated by adding further to this systematic error list. In PinYin forms, linguistic differences between Southern China and Northern China create frequent difficulty. For example, "zhong" may be entered as "zong" and in this case by allowing the alternate spelling to be used, an intended item may be found. As explained above, the additional unintended result which may be ignored by the user may be preferable to the frustration of finding no matching indexes 13.

The foregoing is broadly applicable to any search application that uses a reduced keypad for data entry with the benefit that it is independent of the symbology in use, and variants will be evident to one skilled in the art.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A device, comprising:
   a storage configured to store a database comprising at least one index, wherein each of the at least one index comprises at least one descriptor associated with an item in memory,
a first pointer that identifies a location of the item, and
a second pointer that identifies a location of information that corresponds to the item;
an input mechanism for entry by a user of strokes corresponding to ideographic characters, and of character keys corresponding to the ideographic characters;
at least one processor configured to
search the database for indexes having descriptors that match the strokes or characters entered by the user, and
provide for display to the user
the ideographic character and the alphabetic equivalent for each of the indexes that have matching descriptors, and
a list of selectable icons each corresponding to one of the indexes, wherein each of the selectable icons comprises a type indicator identified by the second pointer for a corresponding index.

2. The device of claim 1, wherein at least one of the descriptors comprises any of a number or text.

3. The device of claim 1, wherein the at least one processor is further configured to rearrange the list of selectable icons upon a selection of one of the selectable icons, wherein selectable icons that match the selected icon are displayable within an area of a display.

4. The device of claim 1, wherein at least one of the items has a corresponding icon that is displayable to the user.

5. The device of claim 1, wherein the information identified by the second pointer comprises an audible output.

6. The device of claim 1, wherein at least one of the items comprises a computer program.

7. The device of claim 1, wherein the type indicators identify a general class to which the corresponding items belong.

8. The device of claim 7, wherein each of the at least one index is comprised of 8 bytes, at least one of which is used to store the type indicator.

9. The device of claim 8, wherein one of the bytes is used to store a first descriptor.

10. The device of claim 9, wherein another one of the bytes is used to store a second descriptor.

11. The device of claim 8, wherein at least one of the bytes is used to store the first pointer.

12. The device of claim 1, wherein at least two of the indexes have a first pointer pointing to the same location, but have different descriptors.

13. A method, comprising the steps of:
providing a database comprising at least one index, wherein each of the at least one index comprises
at least one descriptor associated with an item stored in memory,
a pointer that identifies a location of the item, and
a second pointer that identifies a location of information that corresponds to the item;
entering a search query by a user, wherein the search query comprises any of strokes corresponding to an ideographic character, or of character keys corresponding to the ideographic character;
searching the database for indexes having descriptors that match the strokes or characters entered by the user; and
providing for display to the user
the ideographic character and the alphabetic equivalent for each of the indexes that have matching descriptors, and
a list of selectable icons each corresponding to one of the indexes, wherein each of the selectable icons comprises a type indicator identified by the second pointer for a corresponding index.

14. The method of claim 13, wherein the type indicators identify a general class to which the corresponding items belong, and wherein the method further comprises the steps of:
identifying the type indicator of items having descriptors that match the entered search query;
searching the database for items having the identified type indicator; and
providing for display to the user icons corresponding to the items having the identified type indicator.

15. The method of claim 13, wherein the list is arranged to have the items with matching descriptors in one location of the list, and to have the items without matching descriptors in another location of the list.

16. The method of claim 13, wherein at least one of the descriptors comprises any of a number or text.

17. The method of claim 13, further comprising the steps of:
receiving a selection by the user of one of the selectable icons; and
rearranging the list of selectable icons upon the selection of one of the selectable icons by the user, wherein selectable icons that match the selected icon are displayable within an area of a display.

18. The method of claim 13, wherein at least one of the items has a corresponding icon that is displayable to the user.

19. The method of claim 13, wherein at least one of the items stored in memory comprises a computer program.

20. The method of claim 13, wherein the index information is comprised of 8 bytes, at least one of which is used to store the second pointer.

21. The method of claim 20, wherein one of the bytes is used to store a first descriptor.

22. The method of claim 21, wherein another one of the bytes is used to store a second descriptor.

23. The method of claim 20, wherein at least one of the bytes is used to store the first pointer.

24. The method of claim 13, wherein at least two of the indexes have a first pointer pointing to the same location, but have different descriptors.

* * * * *